(No Model.) 5 Sheets—Sheet 2.

A. GÜDEL & A. CHOPARD.
ENGRAVING MACHINE FOR MULTIPLE COMBINATIONS.

No. 375,705. Patented Dec. 27, 1887.

Witnesses:
Benj. G. Cowl
Arthur P. Miller

Arnold Güdel
Adhémar Chopard, Inventors
by Louis Bagger & Co.,
Attys.

(No Model.) 5 Sheets—Sheet 3.

A. GÜDEL & A. CHOPARD.
ENGRAVING MACHINE FOR MULTIPLE COMBINATIONS.

No. 375,705. Patented Dec. 27, 1887.

Witnesses:
Benj. G. Cowl
Arthur P. Miller

Arnold Güdel
Adhémar Chopard, Inventors:
by Louis Bagger & Co.
Attys.

(No Model.) 5 Sheets—Sheet 4.
A. GÜDEL & A. CHOPARD.
ENGRAVING MACHINE FOR MULTIPLE COMBINATIONS.
No. 375,705. Patented Dec. 27, 1887.
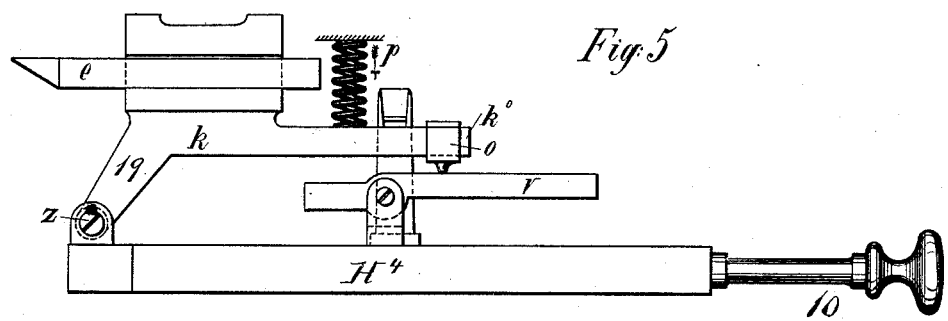
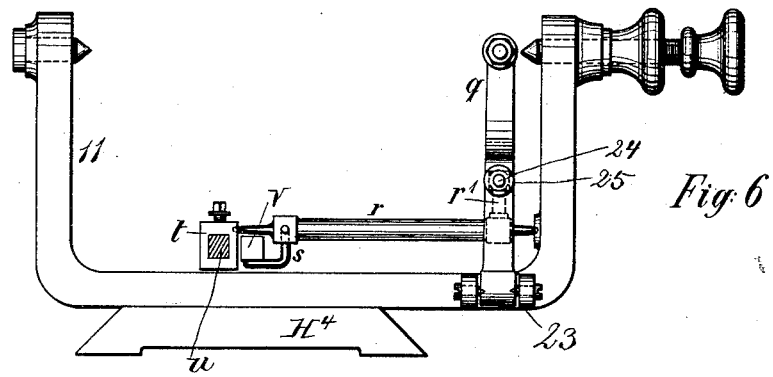
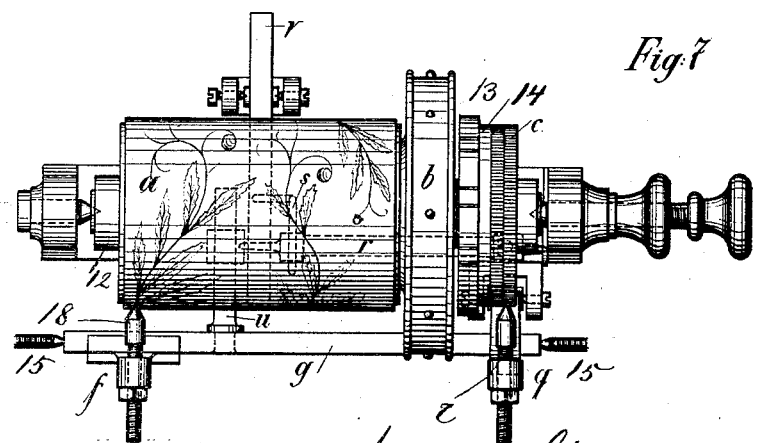
Witnesses:
Benj. G. Cowl.
Arthur P. Miller.
Arnold Güdel,
Adhémar Chopard, Inventors.
by Louis Bagger & Co.
Attys.

(No Model.) 5 Sheets—Sheet 5.

A. GÜDEL & A. CHOPARD.
ENGRAVING MACHINE FOR MULTIPLE COMBINATIONS.

No. 375,705. Patented Dec. 27, 1887.

Witnesses:
Benj. H. Cowl
Arthur P. Miller

Inventors:
Arnold Güdel
Adhémar Chopard
by Louis Bagger & Co.
Attys.

N. PETERS, Photo-Lithographer, Washington, D. C.

United States Patent Office.

ARNOLD GÜDEL AND ADHÉMAR CHOPARD, OF BIEL, BERNE, SWITZERLAND; SAID CHOPARD ASSIGNOR TO SAID GÜDEL.

ENGRAVING-MACHINE FOR MULTIPLE COMBINATIONS.

SPECIFICATION forming part of Letters Patent No. 375,705, dated December 27, 1887.

Application filed March 7, 1887. Serial No. 230,031. (No model.) Patented in Germany June 22, 1886, No. 38,448.

*To all whom it may concern:*

Be it known that we, ARNOLD GÜDEL and ADHÉMAR CHOPARD, citizens of the Republic of Switzerland, both residing at Biel, in Switzerland, have invented certain new and useful Improvements in Engraving-Machines for Multiple Combinations, (for which Letters Patent have been received in Germany, June 22, 1886, No. 38,448,) of which the following is a specification, which will enable others skilled in the art to which it appertains to make and use the same, reference being had to the accompanying drawings, which form a part of the specification.

This invention has relation to machines for engraving, in which a pattern is employed having the design formed raised from the surface, and its purport is to enable patterns of a soft substance—such as wood, zinc, or similar material—to be used in the place of patterns made from steel, and likewise to produce various styles of work from the same pattern; and to that end it consists in the improved construction and combination of parts of the mechanism for moving the graver and its support, as hereinafter more fully described and claimed.

Figure 1:
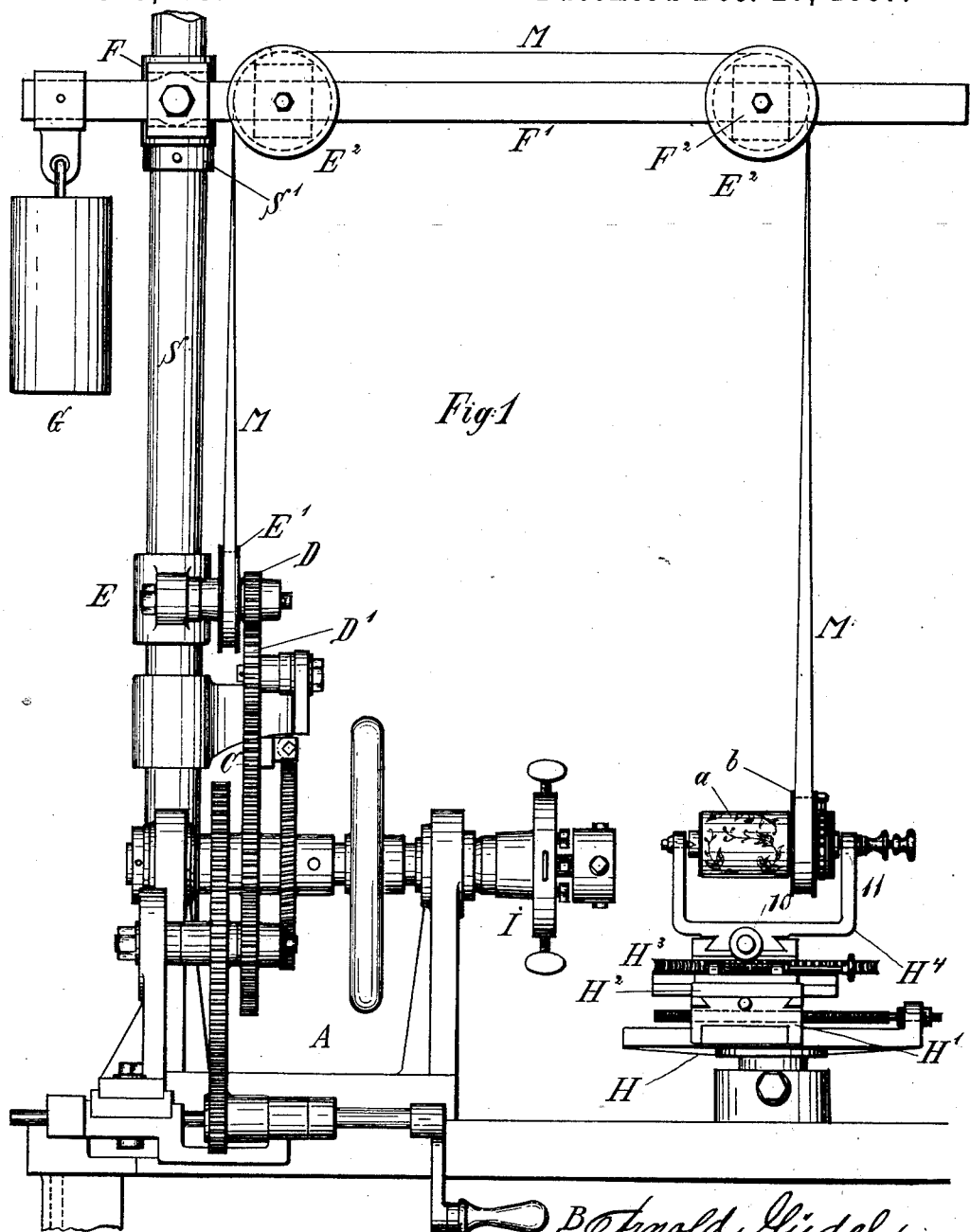
Figure 2:
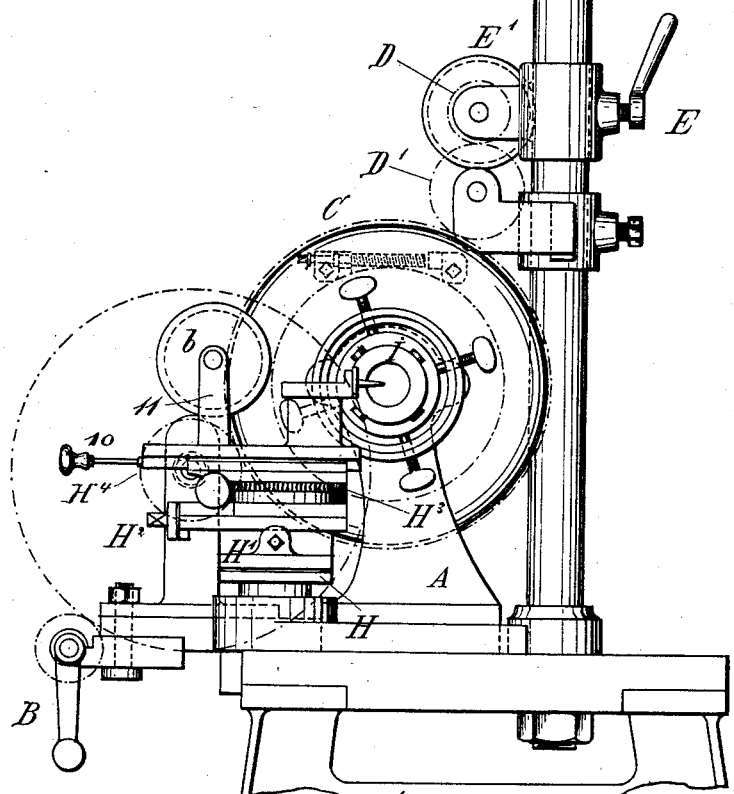
Figure 3:
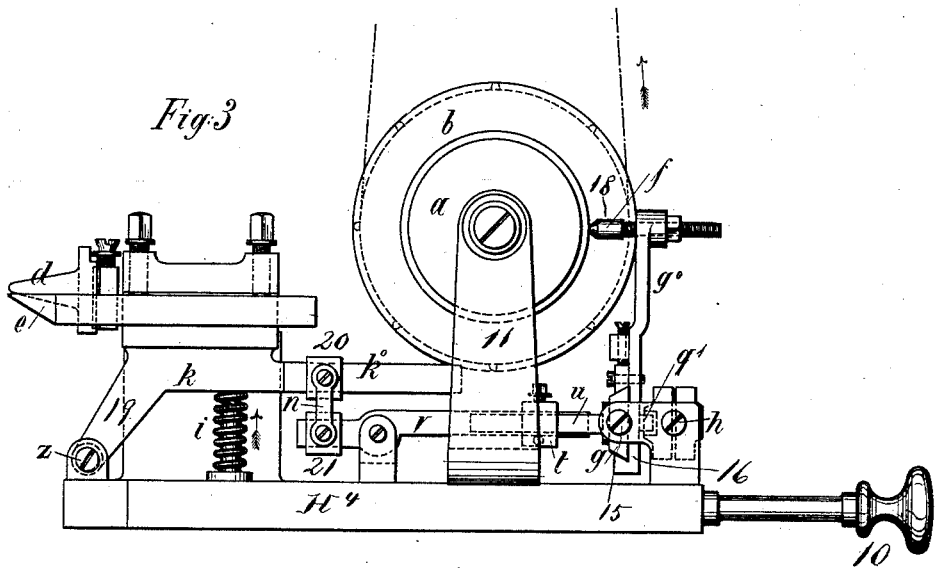
Figure 4:
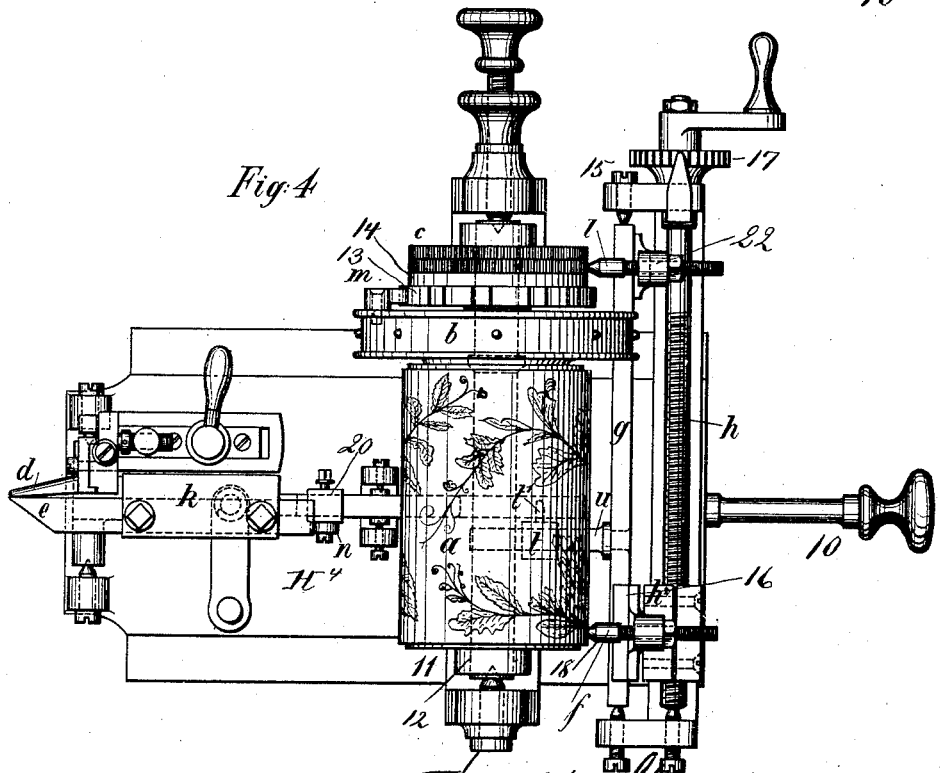
Figure 8:
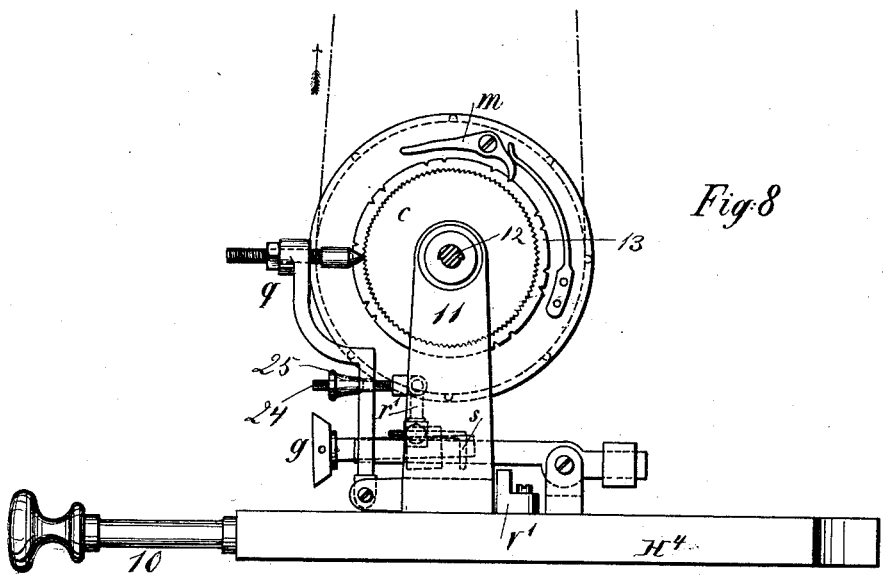
Figure 9:
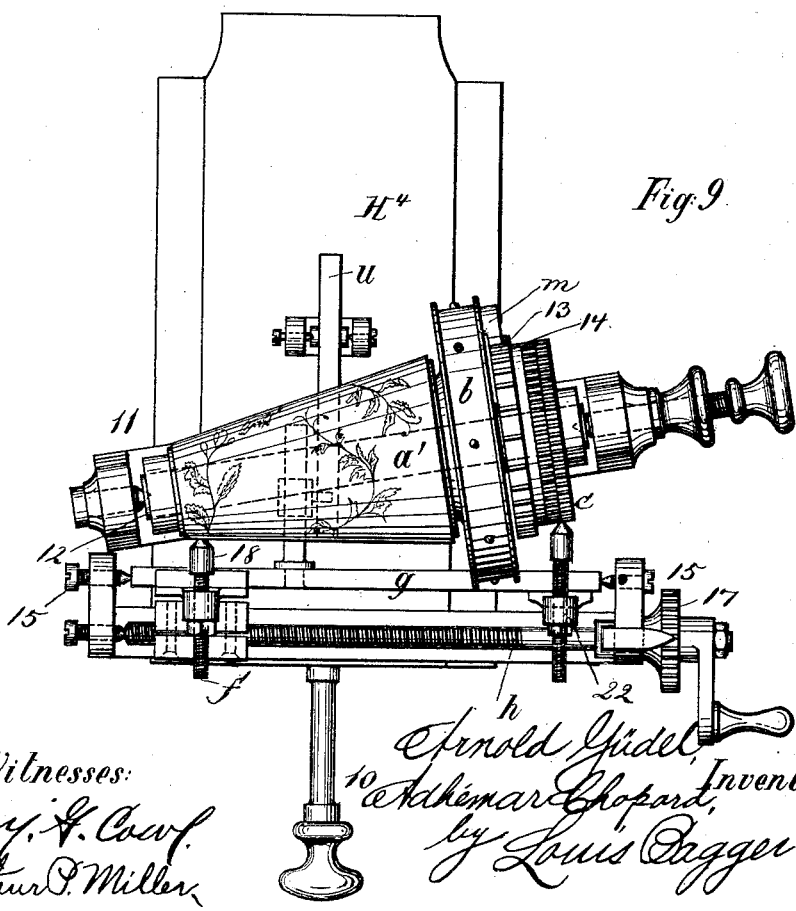

In the accompanying drawings, Figure 1 is a front view of the entire machine. Fig. 2 is an end view of the same, the cog-wheels being shown in dotted lines. Fig. 3 is a side view of the graving mechanism on an enlarged scale. Fig. 4 is a plan view of the same. Fig. 5 is a detail side view of the holder for the graver and its connections, showing the said connections adjusted for engraving the design in deep lines below the ground. Fig. 6 is a front detail view of another adjustment of the operating mechanism for the graver. Fig. 7 is a plan view of the same. Fig. 8 is an end view; and Fig. 9 is a plan view of the pattern-support and part of the mechanism for guiding the graver, showing it adjusted for supporting a conical pattern.

Similar letters and numerals of reference indicate corresponding parts in all the figures.

The machine has the frame A of the usual construction, and the shaft of the mandrel or chuck I may be revolved by the crank B through suitable gearing. A cog-wheel, C, upon the shaft of the mandrel or chuck meshes with an intermediate cog-wheel, D', which again meshes with an interchangeable cog-wheel, D, journaled together, with a band-pulley, E', between arms projecting from a sleeve, E, sliding adjustably, by means of a suitable set-screw, upon an upright, S. The band-pulley E' is provided with studs in its periphery, and a perforated metallic belt, M, passes under it, having the perforations registering with and engaging the studs, and this belt passes over two pairs of guide-pulleys, $E^2$, to a band-pulley, $b$, upon the shaft holding the pattern, which in this manner may be revolved by revolving the crank-shaft. The guide-rollers are journaled upon studs or stub-axles projecting from sleeves $F^2$, sliding upon a lever, F', which is pivoted near its inner end to a sleeve, F, turning upon the upright and bearing with its lower end against a supporting-collar, S', secured upon the same, and the short inner arm of this lever has a counterpoise, G, supported upon it, which will counterbalance the downward drag upon the long arm of the lever by the belt. The outer sleeve, sliding upon the lever and the lever swinging in a horizontal plane upon the upright, will admit of the guide-pulleys and the belt following the adjustments of the pattern shaft and its support, so that the belt will at all times be nearly vertical above the pulley upon the pattern-shaft, driving the same without any side draft.

A frame, H, is supported upon the bench, turning in a horizontal plane and having suitable means for securing it, and a frame or slide, H', slides adjustably upon the upper face of this frame, sliding longitudinally to the bench and having a suitable screw, by means of which it may be moved to one side as the spindle of the bench is revolved, suitable gearing being provided for the purpose of accomplishing this automatically, which gearing, however, need not be shown or described, as any well-known form of feeding mechanism for the tool-stand may be employed. A frame, $H^2$, slides transversely upon the longitudinally-sliding frame, and a turn-table, $H^3$, is pivoted upon the upper side of the same, and may be adjusted by a suitable worm-gear.

The mechanism for holding and operating the graver is shown in Figs. 3, 4, 5, 6, 7, 8, and 9, drawn on an enlarged scale, and this mechanism is supported upon a bed, H⁴, which slides transversely in the horizontally-pivoted turn-table, and is provided with a suitable handle, 10, by means of which it may be brought toward the work and drawn off from the same. This bed is formed with a bifurcated frame, 11, and the shaft 12 for the pattern $a$ is journaled between the ends of this frame and has the band-pulley $b$ secured upon it, which pulley is provided at one face with a pawl, $m$, which engages a ratchet-disk, 13, turning loosely upon the shaft or spindle and having cogged or serrated disks $c$ and a smooth disk, 14, secured to its face concentric with the same. A prismatic rail, $g$, is pivoted between suitable taps, 15, with its ends forward of the pattern, and an arm, $g^0$, slides with a box, 16, at its lower end upon this rail, and has a forwardly-projecting pin, $q'$, at its lower end, which projects into a recess in a box, $h^2$, through which a screw, $h$, passes, serving to adjust the box, the screw being parallel with the rail and having a suitable handle, 17, at one end for turning it. The upper end of the arm has a screw-threaded pin, $f$, inserted through it, and the rear end of this pin is formed with a head, 18, with which it bears against the pattern, following the contour of the same.

The pattern is cylindrical and has the design carved into it in relief, so that the pin upon the arm and the arm may be tilted forward from the pattern when striking a raised portion of the design and tilted toward the pattern when striking a cut-away portion of the design, graduating the tilt according to the raise of the design upon the pattern-roller. The rail has an arm, $u$, projecting from it, and a slide, $t$, is secured upon this arm and has a laterally-projecting pin, $t'$, which projects into a registering-perforation in the long arm of a lever, $v$, fulcrumed near the other end.

The tool-holder or graver-holder $k$ is formed with a downwardly-inclined arm, 19, the lower end of which is pivoted between pointed screws $z$, and the graver $e$ is suitably clamped and has a guard, $d$, projecting with its rounded end to near the point of the graver, serving to limit the depth of the cut of the graver.

The tool-holder is provided with an inwardly-projecting arm, $k^0$, upon which slides a slide, 20, connnected pivotally, by means of a link, $n$, to a similar slide, 21, upon the short arm of the lower lever; and it will now be seen that when the arm having the pin bearing against the pattern is tilted away from the same by a raised portion of the design the arm of the rail will be tilted upward, tilting the long arm of the lever upward, thus causing the downwardly-tilted short arm of the lever to tilt the arm of the tool-holder down and drawing the graver from the work, and when the pin arrives at a depression in the design of the pattern the movable parts will be tilted oppositely, forcing the graver toward the work and causing it to cut into the same, so that the ground of the pattern will be worked, while the design will remain intact. A spring, $i$, is secured below the tool-holder, bearing upward against the same and serving to force the graver against the work. An arm, 22, projects upward from the rail, and is provided with a pin, $l$, which may bear against the peripheries of the smooth disk or the serrated or milled disks; and it will be seen that when the graver is tilted toward the work the pin $l$ will vibrate the rail and all the working parts, if adjusted to bear against one of the serrated disks, causing the ground of the work to be grained, the graver making short strokes against the work, while the graver will make lines if the pin is adjusted to bear against the smooth disk, this adjustment of the tool-holder admitting of two classes of work—viz: bringing forth the raised design upon either a lined or grained ground.

By having the tool-holder provided with the downwardly-inclined arm, and having it pivoted at the end of the same, the graver will receive the same sweeping or rounded motion which the hand of an engraver will give it, the cut of the tool of this machine being in this manner of the same character as a cut done by hand.

For the purpose of producing a third class of work from the same pattern and design—viz, a design in which the lines of the design are cut into the ground—the adjustment shown in Fig. 5 is employed. In this adjustment the spring, bearing from below against the tool-holder, is removed, and a spring, $p$, is suitably supported, bearing from above against the arm of the tool-holder; and the coupling, between the short arm of the lever and the arm of the tool-holder, is removed, and a block, $k^0$, secured upon the end of the said arm bearing from above against the long arm of the lever. It will now be seen that when the pin strikes a raised portion of the pattern-roller the arm is tilted from the roller and the long arm of the lever is tilted upward, which forces the arm of the tool-holder upward and the graver toward the work, so that the graver will cut when the pin strikes the raised portions of the pattern and will be drawn back from the work when the pin strikes the lower portions of the pattern, making a cut design in a smooth ground.

When it is desired to have the design cut in the work and grained with a smooth ground, the adjustment shown in Figs. 6, 7, and 8 is used, in which the arm bearing against the serrated disks is removed from the rail, and instead of this arm another arm, $q$, is pivoted between lips 23 upon the bifurcated frame. A small spindle or shaft, $r$, is pivoted with one end in the frame and with the other end in the slide $t$ upon the arm of the rocking rail, and this shaft is provided with an inwardly and laterally bent arm, $s$, which may bear with its laterally-bent end under the long arm of the lever, the pin connecting the arm and the lever being removed, so that the arm may be moved independently of the lever. An arm, r', projects upward from the shaft and has the inner end of a screw, 24, pivoted to its end, the said screw being secured by means of nuts 25 in the arm having the pin, so that the said arm and the shaft may be vibrated and rocked without affecting the arm from the rail or the lever. When, now, the arm from the rail is raised on the pin striking a raised portion of the pattern, the end of the shaft will be raised, so as to bring the end of the inwardly and laterally bent arm to bear against the lever-arm, raising the same, and in doing so the graver is forced against the work and the vibrating arm will give the graver the vibrating motion which produces the grained surface.

When it is desired to have a raised and grained design upon a lined ground, the vibrating arm is retained and its arm and shaft; but the adjustment of the spring and lever connection with the tool-holder is changed to be the same as shown in Figs. 3 and 4, the entire tool stand or support being adjusted so as to continually hold the graver in contact with the work, but forcing it with more force toward it when the guide-pin bears into a cut-away portion of the pattern than when it bears against a raised portion of the same.

By changing the construction of the mechanisms for holding the work and moving the same and the feeding mechanisms for the same, irregular forms of articles may be engraved and oval or flat surfaces may be treated, and for engraving conical objects the position of the spindle for the conical pattern is changed to stand obliquely to the rocking rail; but otherwise the parts of the mechanism are the same as when cylindrical objects are engraved with cylindrical patterns.

It will be seen that by having the arms and levers interposed between the arm bearing with its pin against the pattern and the tool-holder the motion is considerably reduced and the force required to tilt the tool-holder is less than it would be with direct connection between the arm having the guide-pin and the tool-holder, so that soft materials—such as wood, tin, zinc, or other similar easily-worked substances—may be used in the manufacture of the patterns, rendering the making of the patterns easier and less expensive than where steel patterns have to be used on account of the heavy pressure of the guide-pin upon the same, as in the machine heretofore used. The spring will assist, by bearing against the tool-holder, in throwing the guide-pin and its arm into the depressions of the pattern.

Having thus described our invention, we claim and desire to secure by Letters Patent of the United States—

1. In a machine for engraving cylindrical articles, a tool-holder having a downwardly-inclined arm at its outer end pivoted at the end of the said arm, and having an inwardly-projecting arm provided with means for tilting it, as and for the purpose shown and set forth.

2. In a machine for engraving revolving articles, the combination of a revolving pattern having the design formed by raised and depressed portions, a guide-arm having a pin bearing against the face of the pattern, and having means for feeding the said arm to one side, a tool-holder having a downwardly-inclined arm at its outer end pivoted to the frame, and having a rearwardly-projecting arm and a spring bearing against the same, and suitable lever-connection with the guide-arm, as and for the purpose shown and set forth.

3. In a machine for engraving revolving articles, the combination of a revolving pattern having raised design upon it, a rail rocking at its ends and having suitable connection with the tool-holder, an arm sliding with a box upon the rail and having a pin at its upper end bearing against the pattern, and having a short pin projecting from the box, a screw journaled parallel to the rail and having means for turning it, and a female-threaded block upon the said screw having a recess receiving the pin of the box upon the rail and admitting of vertical play of the same, as and for the purpose shown and set forth.

4. In a machine for engraving revolving articles, the combination of a revolving pattern having the raised design upon its face, an arm having a guide-pin bearing against the pattern, and having means for feeding it laterally, a rocking rail having the arm sliding upon it and formed with an arm projecting under the pattern, and provided with a sliding block having a laterally-projecting pin, a lever fulcrumed near one end under the pattern and having the pin of the sliding block pivoted to its long arm, a tool-holder pivoted at the lower end of an outwardly-inclined arm and having an inwardly-projecting arm and a spring bearing against it, and suitable movable connection between the lever and the arm of the tool-holder, as and for the purpose shown and set forth.

5. In a machine for engraving revolving articles, the combination of a revolving pattern having the design raised upon its face, and having a smooth-edged disk and disks with serrated edges journaled concentric with it at one end, a guide-arm upon a rocking rail having a pin bearing against the pattern and having means for feeding it upon the rail, an arm projecting from the rocking rail and having a pin bearing against the disks at the end of the pattern, a rocking tool-holder having a rearwardly or inwardly projecting arm, and a suitable lever and arm connection between the rail and the tool-holder for rocking the latter with the arms upon the rail, as and for the purpose shown and set forth.

6. In a machine for engraving revolving articles, the combination of a revolving pattern-spindle having a band-pulley and journaled in a support having a universal adjustment, a band-pulley driven by the chuck-spindle of the lathe and journaled upon an adjustable sleeve upon an upright, a lever pivoted upon a sleeve turning horizontally upon the upright, a counterpoise at the short arm of the lever, sleeves sliding upon the long arm of the lever and having guide-pulleys journaled upon their sides, and an endless belt passing under the band-pulleys and over the guide-pulleys, as and for the purpose shown and set forth.

In testimony whereof we hereunto sign our names, in the presence of two subscribing witnesses, this 10th day of January, 1887.

ARNOLD GÜDEL.
ADHÉMAR CHOPARD.

Witnesses:
EMIL BLUM,
PH. G. MARKS.